3,196,127
RUBBER CONTAINING HYDROXYLAMINE-
TREATED CARBON BLACKS
Gerard Kraus, Bartlesville, Okla., assignor to Phillips
Petroleum Company, a corporation of Delaware
No Drawing. Filed Dec. 7, 1959, Ser. No. 857,536
11 Claims. (Cl. 260—41.5)

This invention relates to rubber vulcanizates having improved properties of resilience and hysteresis. In one aspect this invention relates to a method for treating carbon black so as to impart improved properties of resilience and hysteresis to rubber articles having the carbon black incorporated therein.

The use of carbon black as a reinforcing agent for rubber has long been known and is now standard practice in the rubber industry in the manufacture of tires and other articles used in heavy duty service. Along with good tensile and high modulus values, properties of high resilience and low hysteresis of the vulcanizates are extremely important and frequently are determining factors for the use of one rubber composition over another. Low values of hysteresis are reflected in low heat build up in automobile tires, particularly in high speed service and in situations where heavy loads are transported. Because of the increasing use of turnpikes and toll roads where long distances are traveled at high speeds, the hysteresis characteristics of the rubber compositions used in fabricating tires for use in such service are becoming more and more important.

It is, therefore, a principal object of this invention to provide rubber vulcanizates having improved hysteresis properties. It is also an object of this invention to provide a method for treating carbon black so that rubber vulcanizates having such carbon blacks incorporated therein display improved properties of hysteresis. It is also an object of this invention to provide rubber vulcanizates having improved values of resilience. A further object of this invention is to provide a method for treating carbon black so that rubber vulcanizates containing such carbon black display improved properties of resilience. Still another object of this invention is to provide rubber vulcanizates having reduced values of hysteresis, and increased resilience and at the same time having excellent tensile values and high modulus values. Other objects and advantages will be apparent to one skilled in the art upon study of the present disclosure, including the detailed description of the invention.

Broadly, the invention contemplates rubber vulcanizates having excellent tensile values, high modulus values, and distinctly improved resilience and hysteresis properties obtained by treating the carbon black used in compounding the rubber with hydroxylamine prior to incorporating the carbon black in the rubber. It has been found that quinone groups are present in carbon blacks and it is believed that the hydroxylamine reacts with the quinones to convert them into oximes. Although this is believed to be the mechanism through which the hydroxylamine accomplishes the improvement in the carbon black for the preparation of rubber vulcanizates therefrom, I do not wish to be bound by this theory for the operation of the invention. At any rate, carbon blacks treated according to the process of my invention apparently possess increased vulcanization activity, particularly with respect to their ability to affect favorably the resilience and hysteresis properties of vulcanized rubber.

According to the process of my invention, carbon black is slurried in an inert liquid, such as water or an alcohol, to which is added hydroxylamine. Hydroxylamine is relatively unstable and inconvenient to handle; therefore, a preferred procedure is to use the hydroxylamine as an acid salt, e.g., hydroxylamine hydrochloride or the like, and then to add a basic or basic-reacting material to hydrolyze the salt. The mixture is then agitated at a temperature usually in the range between about 10 and about 100° C. for about 1 to 30 hours after which the carbon black can be recovered, e.g., on a filter, washed and dried. A particularly preferred temperature range is from about 50 to about 100° C. because the beneficial effect on the carbon black is realized with a minimum of contact time and with a minimum loss of hydroxylamine through decomposition. Temperatures outside the range of 10 to 100° C. can be employed if proper precautions are taken to avoid freezing of the liquid dispersing medium or boiling of the liquid dispersing medium.

The hydroxylamine salts employed are those which are hydrolyzed by a base to a free amine, such as a hydrochloride, hydrosulfate, hydroacetate, and the like. Salts of nitrous acid, nitric acid, hypochlorous acid, and the like, which have strong oxidizing properties are operable in the invention but their use generally should be avoided because such acids lead to decomposition of the hydroxylamine and diminution of the desired effect on the carbon black. The amount of hydroxylamine or hydroxylamine salt employed will generally be in the range of about 1 to about 25 parts by weight (calculated on the basis of free amine) per 100 parts by weight of carbon black. Larger amounts can be used but usually are not desirable from an economic viewpoint since little if any improvement results therefrom. In any event the hydroxylamine in the above range will be in excess of the equivalent amount required to react with the quinones present in the carbon black.

The hydrolysis of the acid salt of hydroxylamine is effected by addition of a basic material to the slurry of carbon black containing the hydroxylamine salt. Such hydrolyzing agents include basic reacting salts such as an alkali metal acetate or carbonate although the alkali metal hydroxides can also be used with satisfactory results. The amount of hydrolyzing agent employed will be equivalent to the amount of hydroxylamine salt or somewhat in excess to the hydroxylamine salt so as to insure hydrolysis of the hydroxylamine salt.

The dispersing medium can be any inert liquid such as water, methanol, ethanol, or the like. A convenient procedure is to perform the treating step with an aqueous slurry of carbon black. When so operating, the treated slurry of black lends itself to use in masterbatching techniques, thus avoiding the necessity of a recovery step to remove the carbon black from the dispersing medium. When operating according to this procedure, the aqueous slurry of carbon black is treated with hydroxylamine and then the rubber latex is added to the carbon black slurry and this mixture, referred to in the industry as carbex, is treated to coagulate the rubber of the latex so that a substantially homogeneous mixture of rubber and carbon black is obtained as the product of the coagulation. The amount of dispersing medium used can be varied over a broad range. Generally, the ratio will be in the order of about 0.25 to about 5 liters of water or alcohol per 100 grams of carbon black.

Carbon blacks resulting from different methods of manufacture are applicable for use in this invention including carbon blacks known as channel blacks, furnace blacks, lamp blacks, and the like. The properties of both natural and synthetic rubbers are improved when carbon blacks treated according to this invention are incorporated therein; however, the invention will be generally used in the manufacture of synthetic rubber articles more than in the manufacture of natural rubber articles because the hysteresis values of synthetic rubbers are generally higher than those of natural rubbers.

The following examples will be helpful in attaining a better understanding of the invention; however, it is to be understood that the examples should not be so interpreted as to restrict or limit the invention unnecessarily.

EXAMPLE I

A slurry was prepared using 50 grams of toluene extracted channel black and 250 ml. absolute ethyl alcohol. To this slurry was added five grams of hydroxylamine hydrochloride and 7.5 grams potassium acetate in 25 ml. water. The system was stirred at reflux temperature for 16 hours. The black was then collected on a filter, washed with water and again slurried in water after which it was recovered on a filter and dried.

Butadiene-styrene rubber (SBR 1500, 23.5 percent bound styrene) was compounded with this black according to the following recipe, along with a control using untreated black.

Table I

| Ingredients: | Parts by weight |
|---|---|
| Rubber | 100 |
| Black | 50 |
| Zinc oxide | 3 |
| Stearic acid | 1 |
| Flexamine * | 1 |
| Sulfur | 1.75 |
| Santocure ** | 1.1 |

*Diarylamine-ketone reaction product 65 percent; N,N'-diphenyl-p-phenylene diamine 35 percent.
**N-cyclohexyl-2-benzothiazole sulfenamide.

Compounding was done on a roll mill and the compounded rubbers were cured at 307° F. for 30 minutes. Evaluation data on the compounded stocks are shown in Table II.

Table II

| Rubber | 300% Modulus, (p.s.i.) | Tensile, (p.s.i.) | $\nu \times 10^4$* Moles/cc. | Resilience (Percent) | $\Delta T$, °F. |
|---|---|---|---|---|---|
| Carbon black treated | 1,830 | 5,100 | 1.83 | 60.9 | 60.2 |
| Carbon black untreated | 1,460 | 5,170 | 1.60 | 58.7 | 67.9 |

*Number effective network chains/unit volume rubber.

EXAMPLE II

High abrasion furnace black was treated in the same manner, using the same amounts of material and the same conditions as shown in Example I except that the system was stirred at 60° C. for 20 hours and reslurried in water overnight. Compounding in rubber and curing were the same as in Example I except that in the compounding recipe 1.88 parts sulfur was used. Evaluation data are shown in Table III.

Table III

| Rubber | 300% Modulus, (p.s.i.) | Tensile, (p.s.i.) | $\nu \times 10^4$ Moles/cc. | Resilience (Percent) | $\Delta T$, °F. |
|---|---|---|---|---|---|
| Carbon black treated | 1,890 | 4,420 | 1.68 | 66.3 | 58.5 |
| Carbon black untreated | 2,130 | 3,390 | 1.75 | 54.0 | 63.7 |

EXAMPLE III

A slurry was prepared using 50 grams of channel black in 1000 ml. water. To the slurry was added five grams hydroxylamine hydrochloride and 7.5 grams potassium acetate. The slurry was stirred at room temperature for 20 hours after which the black was recovered on a filter, washed with water, and dried at 70°C. in a vacuum oven for 20 hours. Rubber was compounded with this black using the same recipe shown in Example II and cured for 30 minutes at 307° F. Data on the vulcanizate and on a control containing untreated black are shown in Table IV.

Table IV

| Rubber | 300% Modulus, (p.s.i.) | Tensile, (p.s.i.) | $\nu \times 10^4$ Moles/cc. | Resilience (Percent) | $\Delta T$, °F. |
|---|---|---|---|---|---|
| Channel black treated | 1,380 | 3,250 | 1.85 | 58.4 | 69.9 |
| Channel black untreated | 1,330 | 4,410 | 1.60 | 56.1 | 72.6 |

Reasonable variations and modifications are possible within the scope of this disclosure without departing from the spirit and scope of the invention.

That which is claimed is:

1. In the process of making carbon black reinforced rubber products wherein a rubber mix containing rubber, curing agents and the reinforcing carbon black is preformed and vulcanized, the improvement comprising treating said reinforcing carbon black with sufficient hydroxylamine to reduce the hysteresis value of the finished rubber prior to incorporating the carbon black in the rubber mix.

2. In the process of making carbon black reinforced rubber products wherein a rubber mix containing rubber, curing agents and the reinforcing carbon black is preformed and vulcanized, the improvement comprising treating said reinforcing carbon black with from about 1 to about 25 parts by weight of hydroxylamine per 100 parts of carbon black in an inert liquid at a temperature in the range of about 10 to about 100° C. for about 1 to about 30 hours.

3. The process of claim 2 wherein the hydroxylamine is obtained by adding an acid salt of hydroxylamine to the carbon black in the inert liquid and then adding a base to hydrolyze the acid salt.

4. The process of claim 2 wherein the inert liquid is water; hydroxylamine hydrochloride and a sufficient amount of potassium acetate to hydrolyze the hydrochloride are added to the water and carbon black; and the carbon black is treated for about 20 hours at room temperature.

5. The process of claim 2 wherein the inert liquid is ethyl alcohol; hydroxylamine hydrochloride and a sufficient amount of potassium acetate to hydrolyze the hydrochloride are added to the alcohol and carbon black; and the carbon black is treated for about 16 hours at the reflux temperature of the alcohol.

6. A process for preparing carbon black reinforced rubber vulcanizates having improved hysteresis properties which comprises suspending carbon black in an inert liquid; admixing with the resulting slurry about 1 to about 25 parts by weight of hydroxylamine per 100 parts of carbon black; maintaining said slurry at a temperature in the range of about 10 to about 100° C. for about 1 to about 30 hours; recovering said carbon black from said slurry; admixing said black as the reinforcing agent with uncured rubber; and curing said rubber.

7. A process for preparing carbon black reinforced rubber vulcanizates having improved hysteresis properties which comprises suspending carbon black in an inert liquid; admixing with the resulting slurry about 1 to about 25 parts by weight, based on the free amine, of an acid salt of hydroxylamine per 100 parts of carbon black and a sufficient amount of a hydrolyzing agent to hydrolyze the hydroxylamine salt; maintaining said slurry at a temperature in the range of about 10 to about 100° C. for about 1 to about 30 hours; recovering said carbon black from said slurry; admixing said black as the reinforcing agent with uncured rubber; and curing said rubber.

8. A process for preparing carbon black reinforced rubber vulcanizates having improved hysteresis properties which comprises suspending carbon black in substantially anhydrous ethyl alcohol to form a slurry; admixing about 10 parts by weight of hydroxylamine hydrochloride per 100 parts of carbon black with the slurry of carbon black in alcohol; admixing about 1.5 parts by weight of potassium acetate per part of hydroxylamine hydrochloride with said slurry; agitating said slurry at the reflux temperature of the alcohol for about 16 hours; separating the carbon black from the slurry; washing the carbon black with water; drying the carbon black; admixing said black as the reinforcing agent with uncured rubber; and curing said rubber.

9. A process for preparing carbon black reinforced rubber vulcanizates having improved hysteresis properties which comprises suspending carbon black in water to form a slurry; admixing about 10 parts by weight of hydroxylamine hydrochloride per 100 parts of carbon black with said slurry; admixing about 1.5 parts by weight of potassium acetate per part of hydroxylamine hydrochloride with said slurry; agitating said slurry for about 20 hours at a temperature of about 60° C.; separating said carbon black from said slurry; washing said carbon black with water; drying said carbon black; admixing said black as the reinforcing agent with uncured rubber; and curing said rubber.

10. A carbon black reinforced rubber vulcanizate wherein the reinforcing carbon black has been treated with sufficient hydroxylamine to reduce the hysteresis value of the vulcanizate.

11. A carbon black reinforced automotive vehicle tire fabricated from rubber wherein the reinforcing carbon black has been treated with about 1 to about 25 parts by weight of hydroxylamine per 100 parts of carbon black slurried in an inert liquid for about 1 to about 30 hours at a temperature in the range of about 10 to about 100° C.

References Cited by the Examiner

UNITED STATES PATENTS

| | | | |
|---|---|---|---|
| 2,767,152 | 10/56 | Bierman et al. | 260—41.5 |
| 2,793,100 | 5/57 | Weihe | 23—209.1 |
| 2,867,540 | 1/59 | Harris | 106—308 |

OTHER REFERENCES

Rubber Age, Braendle, Feb. 1952, pages 609–616.

MORRIS LIEBMAN, *Primary Examiner.*

DANIEL ARNOLD, LEON J. BERCOVITZ, LESLIE H. GASTON, *Examiners.*